United States Patent
Iyer et al.

(10) Patent No.: US 8,418,140 B2
(45) Date of Patent: Apr. 9, 2013

(54) SERVICEABILITY AND CONFIGURATION MANAGEMENT

(75) Inventors: Jayaram R. Iyer, Kirkland, WA (US); Gopal Parupudi, Sammamish, WA (US); Mahmood G. Qadir, Redmond, WA (US); Naveen R. Karri, Redmond, WA (US); Anubhuti Manohar, Redmond, WA (US); Chi-Kit Chan, Bellevue, WA (US); Adil A. Sherwani, Boston, MA (US); Christine H. Tran, Centreville, VA (US); Jason Minick, Warrenton, VA (US); Kevin Joseph Fischer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 992 days.

(21) Appl. No.: 12/468,925

(22) Filed: May 20, 2009

(65) Prior Publication Data

US 2010/0299653 A1    Nov. 25, 2010

(51) Int. Cl.
*G06F 9/44*    (2006.01)

(52) U.S. Cl.
USPC ........... 717/121; 717/168; 717/169; 717/170; 717/171; 717/172

(58) Field of Classification Search .................... 717/121
See application file for complete search history.

(56) References Cited

U.S. PATENT DOCUMENTS

| | | | |
|---|---|---|---|
| 6,314,556 B1 | 11/2001 | DeBusk et al. | |
| 7,475,020 B2 | 1/2009 | Hasan et al. | |
| 2003/0090514 A1 | 5/2003 | Cole et al. | |
| 2004/0153869 A1* | 8/2004 | Marinelli et al. | 714/47 |
| 2005/0198630 A1* | 9/2005 | Tamma et al. | 717/175 |
| 2005/0203771 A1 | 9/2005 | Achan | |
| 2005/0203975 A1* | 9/2005 | Jindal et al. | 707/204 |
| 2006/0178910 A1 | 8/2006 | Eisenberger et al. | |
| 2007/0256056 A1* | 11/2007 | Stern et al. | 717/121 |
| 2008/0201701 A1 | 8/2008 | Hofhansl et al. | |
| 2008/0320473 A1* | 12/2008 | Laska et al. | 717/178 |

OTHER PUBLICATIONS

Chakravorty, Rajiv "MobiCare: A Programmable Service Architecture for Mobile Medical Care", Proceedings of UbiCare 2006: The First Workshop on Ubiquitous and Pervasive Healthcare, Mar. 2006, Italy, http://pp.cs.wisc.edu/~rajiv/pubs/care.pdf.
Ballintijn, Gerco, "A Case Study of the Release Management of a Health-care Information System", http://citeseerx.ist.psu.edu/viewdoc/download?doi=10.1.1.98.34&rep=repl&type=pdf.
Strowes et al., "An Event Service Supporting Autonomic Management of Ubiquitous Systems for e-Health", http://www.dcs.gla.ac.uk/amuse/Papers/debs06.pdf.

* cited by examiner

*Primary Examiner* — Wei Zhen
*Assistant Examiner* — Brahim Bourzik
(74) *Attorney, Agent, or Firm* — Microsoft Corporation

(57) ABSTRACT

Many current computer software platforms support user customization and version upgradability. Unfortunately, upgrading a computer software platform may result in significant loss of user customization data. Additionally, it may be advantageous for users to export and import their customization data to share as customized business solutions with other instances of the computer software platforms. Accordingly, a technique for creating and importing a configuration package and a technique for creating and utilizing an update package is disclosed herein. The configuration package allows configuration data of elements within a computer software platform to be exported and imported. The update package allows elements to be exported within the update package. The update package may be utilized in upgrading, overwriting, and/or creating a new instance of elements. When an existing element is upgraded with an update element within the update package, the existing element's original configuration may be retained.

20 Claims, 10 Drawing Sheets

SERVICEABILITY AND CONFIGURATION MANAGEMENT

BACKGROUND

Many computer programs allow users to customize how they operate and provide for future version upgrades. Unfortunately, updating a highly customized computer program from one version to another may result in loss of customizations, thus increasing serviceability overhead to restored customizations in the newly upgraded version of the program. For example, an enterprise (e.g., hospital) may customize a computer software platform (e.g., software comprising modules used in aggregating enterprise data, billing data, client data, human resource data, etc.) in regards to where the various data is extracted, how the extracted data is formatted, how the formatted data is displayed, and what functionality is associated with the displayed data. It may be advantageous for the enterprise to update the computer software platform and/or modules therein while maintaining the customization. Maintaining customization may mitigate time and expense which otherwise may have been spent in backing up and restoring the customizations or fully redoing the customizations manually on the computer software platform. It may also be advantageous to export the customization of the computer software platform, such that the exported customizations may be imported into other instances of the data aggregation platform (e.g., customizations may be shared as business solution amongst various enterprises, customizations may be migrated from a testing environment into a live environment, etc.).

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, a technique for creating and importing a configuration package along with a technique for creating and utilizing an update package for a computer software platform (e.g., a data aggregation platform, a customizable computer application, etc.) is disclosed herein. A configuration package may be built by receiving a set of one or more selected configuration elements, for example, through an exportation user interface or command line of a first computer software platform. It may be appreciated that a configuration element may be interpreted as configuration data associated with an element (e.g., an application, a baseview, a module, a database view, a database table, a stored query, a module parameter, etc.) of a computer software platform.

For respective selected configuration elements, a corresponding provider may be invoked to derive exportation data from a selected configuration element and to concatenate the exportation data into a data structure. For example, a stored query provider may be invoked to create exportation data from configuration data of a stored query (e.g., a stored query configuration element), wherein the exportation data is concatenated into a data structure. A module provider may be invoked to create exportation data from configuration data, for example, of a patient billing module (e.g., a module configuration element), wherein the exportation data is concatenated into the data structure. A configuration package comprising the exported stored query configuration and the exported patient billing module configuration, for example, may be built from the data structure.

It may be appreciated that the configuration package may be created from a first computer software platform and may be imported into a second computer software platform, for example. The configuration package may be imported by receiving the configuration package and an importation selection of exported configuration elements to import. In one example, an importation selection may be received in response to a user selecting one or more export configuration elements from the configuration package, for example, through an importation user interface or command line associated with a second computer software platform. For respective exported configuration elements within the importation selection, an exported configuration element may be imported into a user specified target element using a corresponding provider. For example, a configuration package comprising an exported patient billing module configuration may be received. The exported patient billing module configuration may be imported into an existing billing module of the second computer software platform. It may be appreciated that a verification may be performed to determine whether the user specified target element comprises one or more baseline components specified by the exported configuration element. For example, the exported patient billing module configuration may not be able to be imported into an existing imaging modules because the existing imaging module may not comprise verified baseline components utilized for proper functioning of the exported patient billing module configuration.

An update package may be built by receiving a set of one or more selected elements (e.g., an application, a module, a stored query, and/or other elements of a computer software platform), for example, through an update package creation user interface or command line. For respective selected elements, a corresponding provider may be invoked to derive update data from a selected element and to concatenate the update data into a data structure. An update package may be built based upon the data structure. It may be appreciated that the update package may be configured such that target elements that are updated with the update package may retain their original target element configuration (e.g., an existing billing module may be upgraded with an update billing module while retaining its original user customization).

The update package may be utilized in upgrading, overwriting, and/or creating a new instance of an element within a computer software platform. The update package and a command to upgrade, overwrite, and/or create a new instance may be received, for example, through an update utilization user interface or command line. In one example, an update package may comprise an update imaging module element. The update imaging module element may be utilized in upgrading an existing imaging module while retaining its original user customization. The update imaging module element may also be utilized in overwriting the existing imaging module. Finally, the update imaging module may be used to create a new instance of the imaging module, which may function along side the existing imaging module within the computer software platform.

It may be appreciated that the system described herein may be configured to host one or more providers, for example, through a provider interface (e.g., a pluggable configuration element provider architecture). The provider interface may provide a standard interface for plugging in various providers (e.g., providers of system objects, providers of elements, etc.). In one example, a provider may be implemented as a plug-in system object provider. The provider may be configured to deal with related elements (e.g., system objects)

through the provider interface, thus allowing for selection of related entities automatically. The provider interface may provide the ability for the system described herein to call back and forth to the provider when dealing with exporting embedded elements of different types. This provides extensibility and the ability to deal with new future elements seamlessly.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
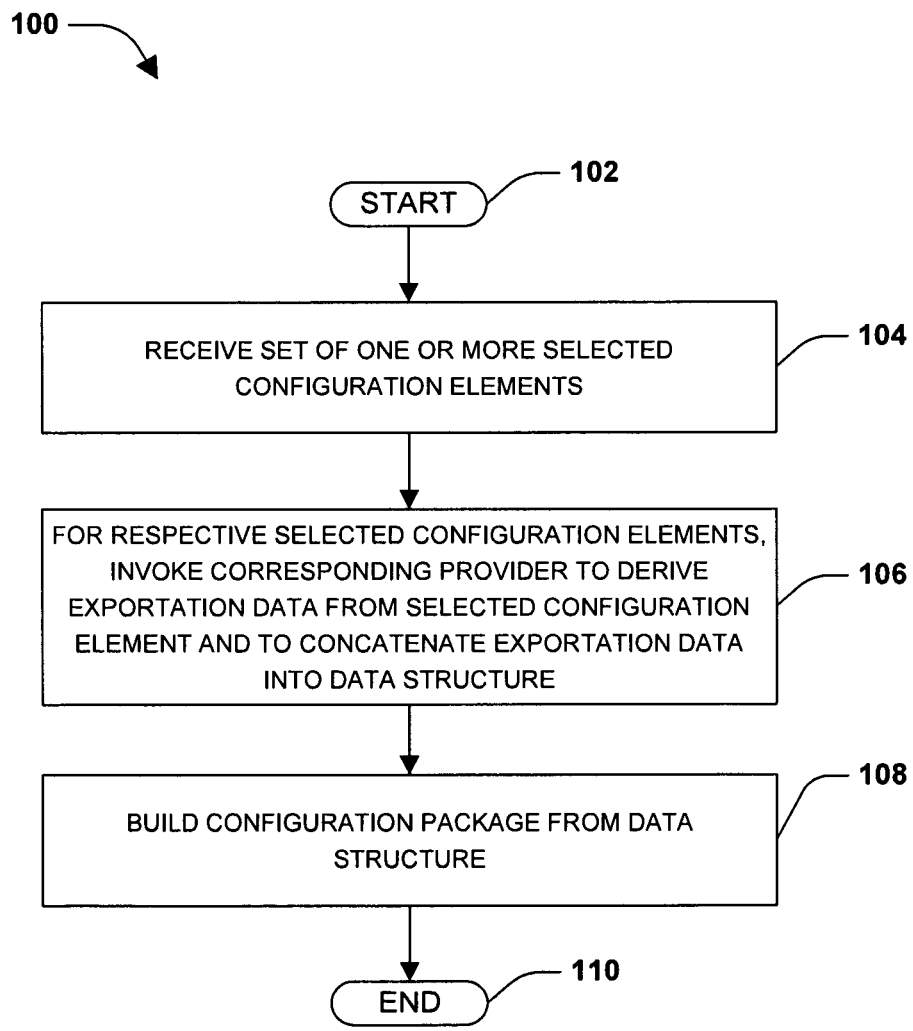
FIG. 1 is a flow chart illustrating an exemplary method of creating a configuration package.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Many computer software platforms (e.g., a data aggregation platform) allow users to customize many aspects of the computer software platform. For example, a user may customize where data is extracted (e.g., a database), how the extracted data is formatted (e.g., a stored query selecting particular columns of data), how the formatted data is displayed (e.g., user interface customizations), and/or functionality associated with the displayed data. Additionally, many computer software platforms may support enhancements to functionality through version upgrades. A module of functionality within the computer software platform or a stored query may be upgraded from version 2.1 to version 2.2, wherein the update module and stored query may comprise additional enhancements.

Upgrading a customizable computer software platform across various versions may result in the loss of user customizations. Currently, users may employ a brute force solution of backing up and restoring the customizations or performing a full recustomization after upgrade. These current solutions are expensive, time and labor intensive, prone to errors and may require intimate knowledge of internal schemas relating to the computer software platform. It may be advantageous to provide a technique to upgrade customized computer software platforms, while retaining user customizations. It may also be advantageous to provide a technique to export user customizations from a computer software platform, which may be imported into other instances of the computer software platform, thus allowing users to share customized business solutions with one another.

Among other things, a technique for creating and importing a configuration package along with a technique for creating and utilizing an update package within a computer software platform (e.g., a data aggregation platform, a customizable computer application, etc.) is disclosed herein.

It may be appreciated that the subject matter discussed herein is not limited to data aggregation platforms and/or environments comprising disparate data sources (e.g., hospital environments), but may be applicable to other computer software platforms (e.g. customizable software applications, upgradable software applications, etc.) and to various users (e.g., enterprises with in-house installation of software or a hosted model of software).

A configuration package may be utilized in sharing and/or migrating user customization of elements from a customizable computer software platform to another instance of the customizable computer software platform. For example, a data enterprise application may be customized in regards to connection information of data sources, formatting of data extracted from the data sources, visual presentation of the data within user interfaces, and/or functionality associated with the data. These customizations may be exported into a configuration package by a user (e.g., corporation 1). Another user (e.g., corporation 2) may import the configuration package into their own separate instance of the data enterprise application. This allows users to produce out of the box solutions (e.g., configuration solutions) that may be shared amongst themselves and/or other users.

An update package may be utilized in upgrading, overwriting, and/or creating a new instance of elements within a computer software platform, while preserving user customizations. For example, a hospital may customize a prescription module (e.g., a portion of a computer software platform that allows hospital personnel to interact with prescription data) by changing module parameters (e.g., information relating to how prescription data is to be displayed within a user interface) and stored procedures (e.g., information relating to how prescription data is extracted and formatted). An update package relating to a new version of the prescription module may be received. The hospital may be able to upgrade their existing prescription module without losing their customizations. The hospital may also overwrite the existing prescription module and/or create a new instance of the prescription module side by side with the existing prescription module.

It may be appreciated that the export package may be utilized for backup and restore purposes, for understanding change tracking and auditing, etc. For example periodic snapshots may be created for an existing instance of a computing platform, wherein the techniques described herein may be utilized in creating the export package, wherein configuration data and/or elements may be exported into the export package.

One embodiment of creating a configuration package for a computer software platform (e.g., a data aggregation platform, a customizable computer application, etc.) is illustrated by an exemplary method 100 in FIG. 1. At 102, the method begins. At 104, a set of one or more selected configuration elements may be received. It may be appreciated that a computer software platform may be comprised of multiple elements (e.g., applications, baseviews, modules, database views, database tables, stored queries, etc.). Configuration elements may comprise customization data associated with the elements.

At 106, for respective selected configuration elements, a corresponding provider may be invoked to derive exportation data from a selected configuration element and to concatenate exportation data into a data structure. For example, the set of one or more selected configuration elements may comprise customization data relating to a module and to a stored query. A module provider may be invoked to create exportation data of the module and a stored query provider may be invoked to create exportation data of the stored query. It may be appreciated that configuration elements may rely upon one another (e.g., a module may comprise module parameters and a stored query may have associated database views) and that configuration elements may be stored across a front tier, a middle tier, and/or a back tier architecture. The one or more providers may be invoked in a particular order to maintain configuration element integrity within the data structure. It may be appreciated that a provider may derive exportation data for a configuration element from the front tier, middle tier, and/or back tier, thus mitigation discrepancies between elements and/or their respective dependencies.

At 108, a configuration package may be built from the data structure. In one example, the configuration package may be one or more files that may be utilized in importing the exported configuration elements within the configuration package. In another example, the configuration package may be void of compiled code. A descriptor file may be associated with the configuration package to provide additional data useful for importation. The descriptor file may comprise a declaration of exported configuration elements and/or importation tool data defining providers that are to be utilized in importing the exported configuration elements. At 110, the method ends.

It may be appreciated that the method illustrated in FIG. 1 may be implemented through an exportation user interface (e.g., See FIG. 5), for example. Within the exportation user interface, one or more configuration elements may be presented, wherein the configuration elements are selectable for exportation. The one or more configuration elements may be grouped by categories (e.g., applications, baseviews, modules, module parameters, database views, database tables, stored queries, parsing scripts, etc.) within the exportation user interface. The set of one or more selected configuration elements may be received through user input within the exportation user interface as the set of one or more selected configuration elements. The method illustrated in FIG. 1 may also be implemented through a command line without a graphical user interface.

Once the configuration package is created, it may be imported into other computer software platforms (e.g., another instance of a data aggregation platform within a separate computing environment, another instance of a unified intelligence system, etc.). For example, the configuration package and an importation selection of exported configuration elements to import may be received. For respective exported configuration elements within the importation selection, a corresponding provider (e.g., a provider specified within extracted importation tool data from a descriptor file) may be invoked to import an exported configuration element into a user specified target element (e.g., a lab provider may import an exported lab module configuration element into an existing lab module). It may be appreciated that the importation tool data may be extracted from a descriptor file associated with the configuration package. Providers may be selected and/or executed to import particular exported configured elements based upon the extracted importation tool data.

It may be appreciated that the importation may be implemented through an importation user interface (e.g., See FIG. 6), for example. Within the importation user interface, one or more exported configuration elements may be presented, wherein the exported configuration elements are selectable for importation. The importation selection may be received based upon user input within the importation user interface, wherein the importation selection may comprise one or more exported configuration elements that are to be imported into corresponding target elements. The importation may also be implemented through a command line without a graphical user interface.

The exportation user interface and importation user interface are user friendly tools allowing for users to create configuration packages from their existing customization solution and share them with other users (e.g., other hospitals, institutions with disparate data source, corporations, etc.).

Figure 2:
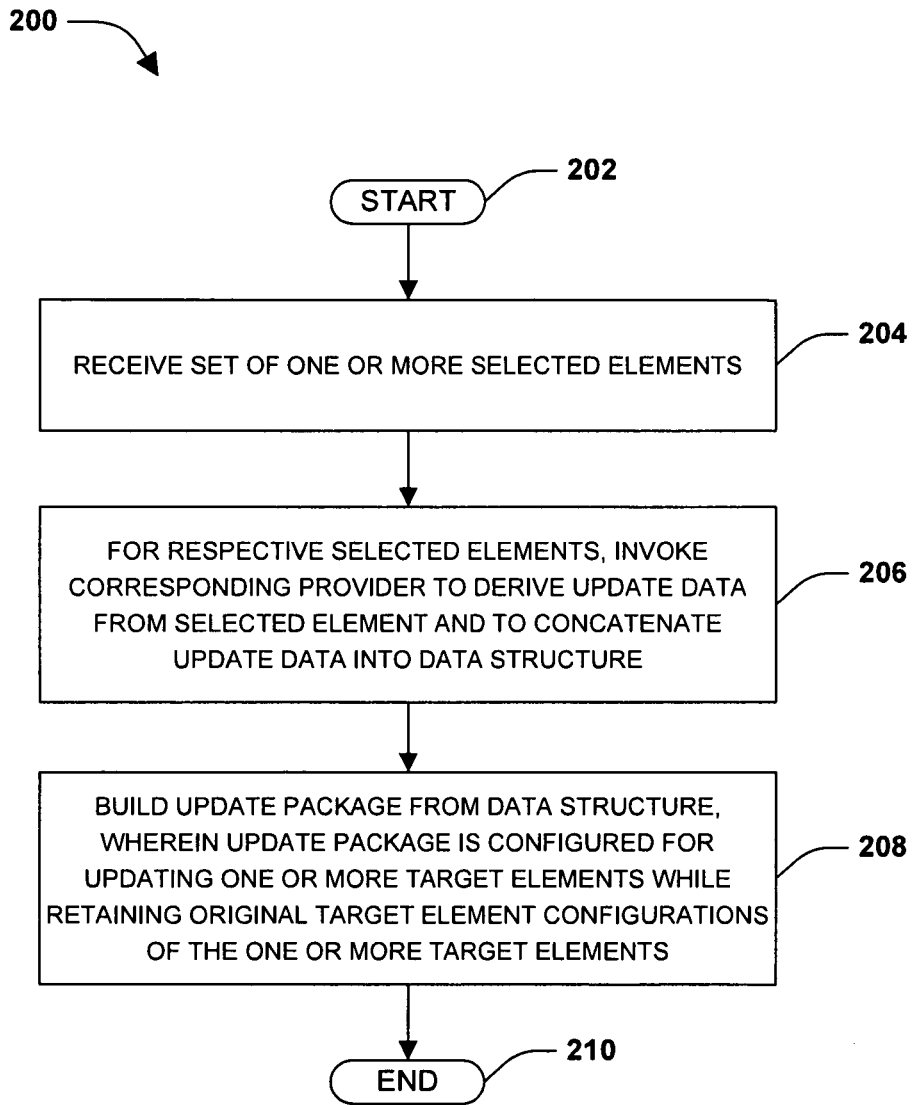
FIG. 2 is a flow chart illustrating an exemplary method of creating an update package.

One embodiment of creating an update package for a computer software platform is illustrated by an exemplary method 200 in FIG. 2. At 202, the method begins. At 204, a set of one or more selected elements is received. For example, a computer software platform may be comprised of multiple elements (e.g., applications, baseviews, modules, database views, database tables, stored queries, parsing scripts, etc.), wherein data associated with the elements may be utilized in creating an update package. It may be appreciated that the update package may be utilized in upgrading from one version to another of an element, overwriting a particular version with an updated version of the element, creating a new instance of the element, etc.

At 206, for respective selected elements, a corresponding provider may be invoked to derive update data from a selected element and to concatenate the update data into a data structure (e.g., a baseview provider may be invoked to derive update data of a particular baseview, which may be utilized in updating or creating a new instance of the particular baseview within another instance of a computer software platform). At 208, an update package may be built from the data structure, wherein the update package is configured for updating one or more target elements, while retaining respective target elements retain their original target element configurations. If the update packages comprising one or more data view update elements, then a script file may be generated. At 210, the method ends.

It may be appreciated that many current update techniques for computer software platforms do not preserve user customization. Thus, many current solutions involve brute force backing up and restoring of configurations or fully recustomizating the update elements, which may be expensive and time/labor intensive. The ability to create update packages configured to retain original target element configurations when utilized for upgrading may mitigate extensive time and expenses that would otherwise be incurred using current techniques. In one example, the use of providers corresponding to particular elements allows the update package and the utilization thereof to preserve user customization (e.g., original target element configuration).

It may be appreciated that the method illustrated in FIG. 2 may be implemented through an update package creation user interface (e.g., See FIG. 7), for example. Within the update package creation user interface, one or more elements may be presented, wherein respective elements are selectable for deriving an update package. The set of one or more selected elements may be received based upon user input within the update package creation user interface. The method illustrated in FIG. 2 may also be implemented through a command line without a graphical user interface.

Figure 3:
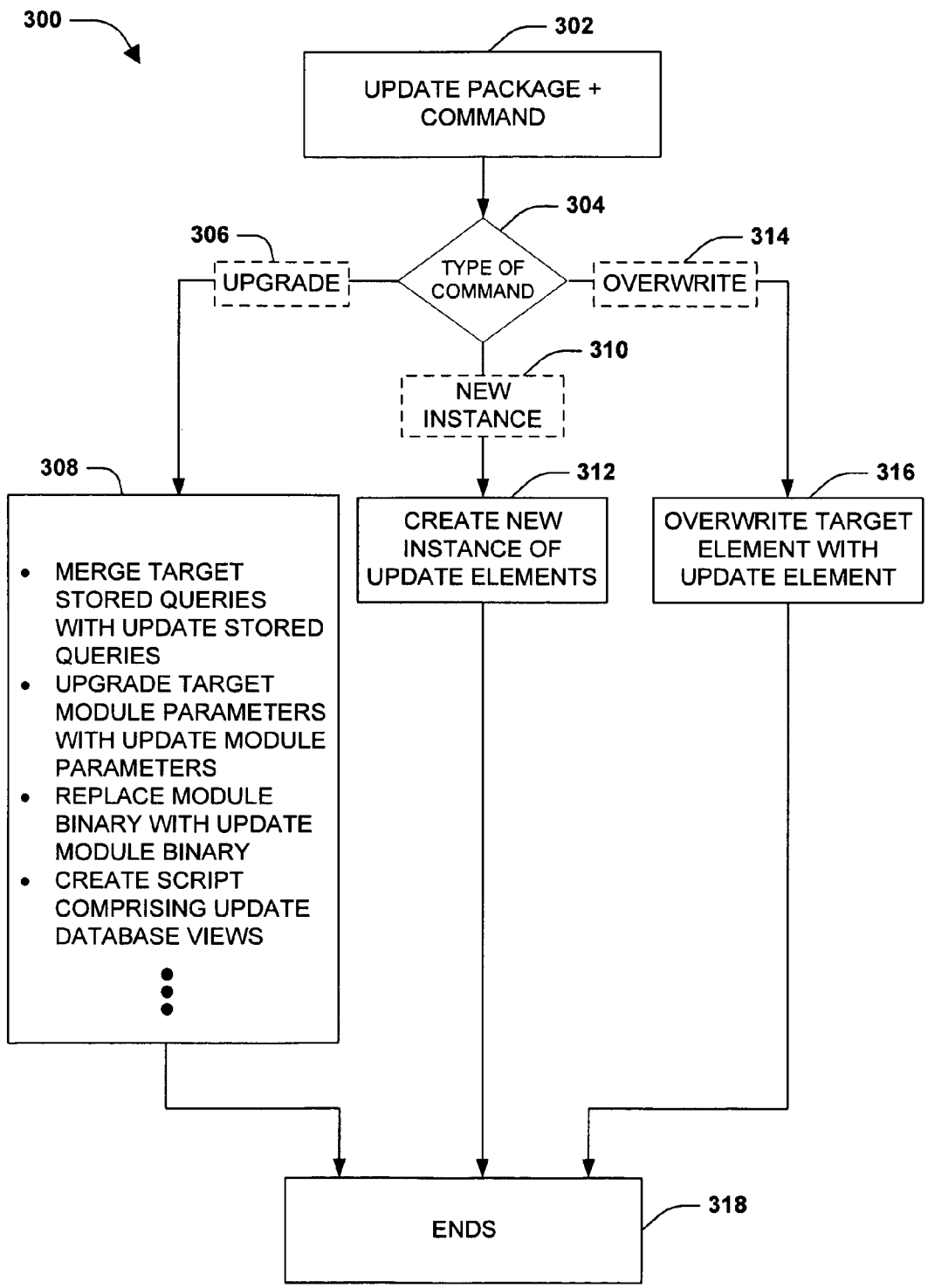
FIG. 3 is a flow chart illustrating receiving an update package and an upgrade selection.

One embodiment of receiving an update package and an upgrade selection associated with a computer software platform is illustrated by an exemplary flowchart 300 in FIG. 3. At 302 an update package comprising one or more update elements and a command may be received. For example, a user may have previously created an update package from one or more elements within an instance of a computer software platform (e.g., a data aggregation platform). At 304, a determination may be made as to whether the command corresponds to an upgrade selection, an overwrite selection, and/or a new instance selection.

If the command corresponds to an upgrade selection 306, then the upgrade selection 306 comprising one or more target elements to upgrade with one or more update elements within the update package may be received. At 308, for respective update elements within the update package, a target element may be upgraded with an update element using a corresponding provider. It may be appreciated that a particular provider may be invoked based upon the type of element that is to be updated because the provider is configured to update that type of element while maintaining original configuration of the existing element. For example, if the target element is a stored query, then the update stored query is merged into the target stored query using a provider configured for updating stored queries. That is, the stored query provider may be configured to update stored queries such that the original configuration of the existing stored query is preserved. If the target element is a module parameter, then the target module parameter is updated with the update module parameter using a provider configured for updating module parameters. If the target element is a module binary, then the target module binary is replaced with the update module binary using a provider configured for updating module binaries. If the target element is a database view, then the target element database view may be left unmodified, while a script file may be generated for manual upgrade. It may be appreciated that these elements and other elements may be upgraded through a variety of techniques that preserve original target element configurations of the target elements.

It may be appreciated that one or more target elements may retain their original target element configuration during upgrade. This allows target elements of a computer software platform to be upgraded (e.g., upgrade from one version to another) without losing user customizations of the computer software platform (e.g., original target element configurations), thus mitigating time and expense in backing up and restoring or recustomizing the computer software platform. For example, preserving original target element configuration may be accomplished through providers that are able to upgrade particular types of elements without losing user customization data.

If the command corresponds to a new instance selection 310, then the new instance selection 310 comprising a target destination may be received. At 312, for respective update elements, a new instance of an update element may be created within the target destination using a corresponding provider. Creating a new instance of an element allows other instances of the element to coexist (e.g., a new instance Lab module may function properly without affecting an existing Lab module within a computer software platform) without interference with other instances of a similar module.

If the command corresponds to an overwrite selection 314, then the overwrite selection 314 comprising one or more target elements to overwrite with the one or more update elements within the update package may be received. At 316, for respective update elements, a target element may be overwritten by an update element using a corresponding provider. At 318, the flow diagram ends.

It may be appreciated that the flowchart illustrated in FIG. 3 may be implemented through an update package utilization user interface (e.g., See FIG. 8), for example. The update package utilization user interface comprising the one or more update elements within the update package may be presented. The update elements may be selectable along with a command corresponding to a new instance selection, and upgrade selection, and/or an overwrite selection. The flowchart illustrated in FIG. 3 may also be implemented through a command line without a graphical user interface.

Figure 4:
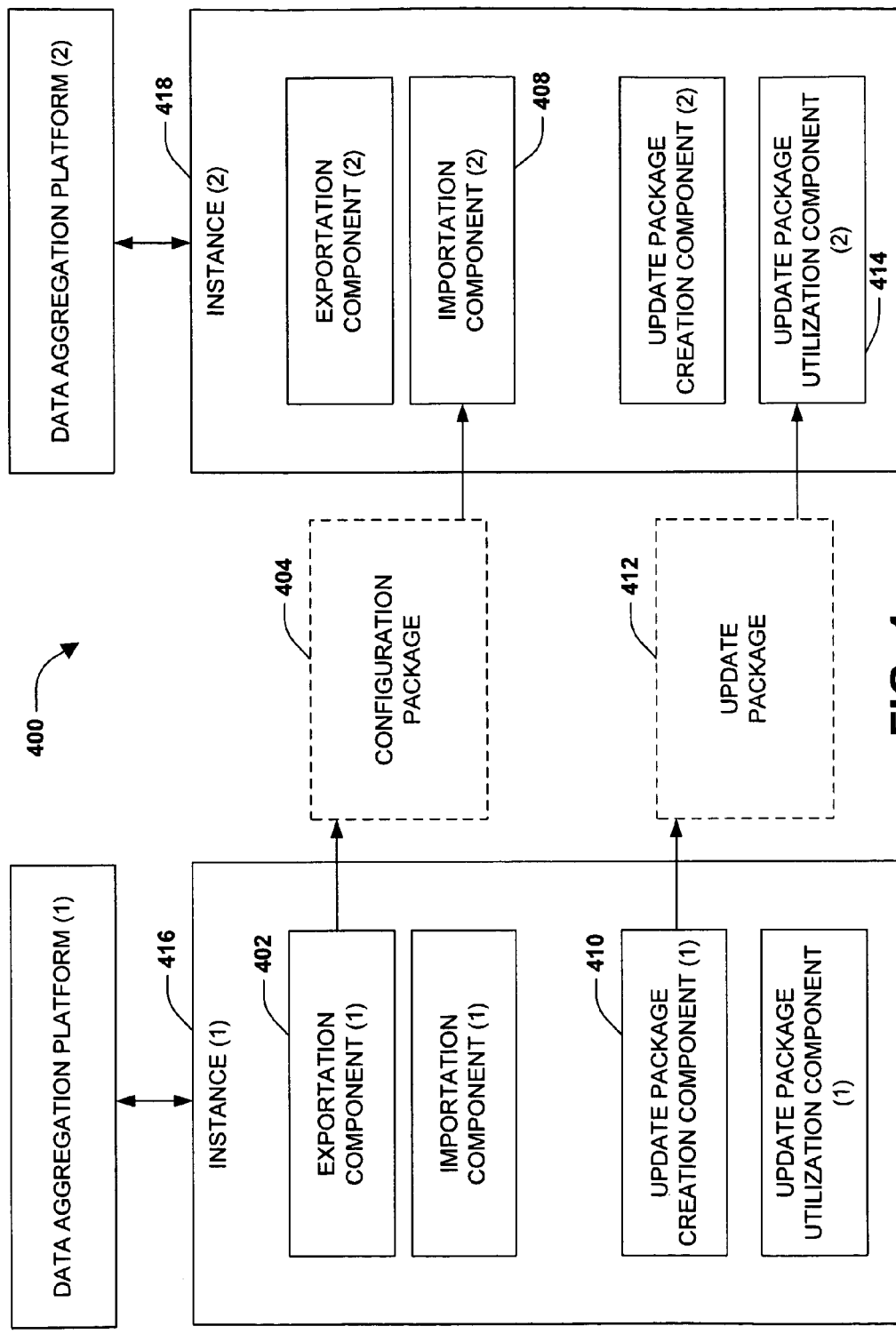
FIG. 4 is a component block diagram illustrating an exemplary system for managing update packages and configuration packages.

FIG. 4 illustrates an example 400 of a first system instance 416 and a second system instance 418 of a system configured for managing update packages and configuration packages for computer software platforms. The first system instance 416 may be associated with a data aggregation platform (1) and the second system instance 418 may be associated with a data aggregation platform (2). It may be appreciated that the data aggregation platforms and/or system instances may be within similar or separate computer environments. For example, the data aggregation platform (1) may be a business solution within a first hospital and the data aggregation platform (2) may be a second data business solution within a second separate hospital).

The first system instance 416 may comprise an exportation component (1) 402, an importation component (1), an update package creation component (1) 410, and/or an update package utilization component (1). The second system instance 418 may comprise an exportation component (2), an importation component (2) 408, an update package creation component (2), and/or an update package utilization component (2) 414.

Within the first system instance 416, the exportation component (1) 402 may be invoked to build a configuration package 404. For example, the exportation component (1) 402 may receive an EKG module configuration (e.g., a selected configuration element associated with an EKG module within the data aggregation platform). The exportation component 402 may invoke a module provider to derive exportation data from the EKG module configuration (e.g., extract configuration data from a front tier, a middle tier, and/or a back tier of the data aggregation platform). The exportation component (1) 402 may concatenate the exportation data into a data structure, from which the configuration package 404 may be built.

Within the second system instance 418, the importation component (2) 408 may be invoked to import the exported EKG module configuration from the configuration package 404 into a target element within the data aggregation platform (2). The importation component (2) 408 may receive the configuration package 404 and an importation selection, wherein the importation selection comprises exported configuration elements to import. For example, a user selection of the exported EKG module configuration to import into an existing EKG module (e.g., a user specified target element) within the data aggregation platform (2) may be received. The exported EKG module configuration may be imported into the existing EKG module using a module provider.

This allows configuration of the EKG module within the data aggregation platform (1) to be exported and imported into the EKG module within the data aggregation platform (2). In this way, users may share customization solutions with one another (e.g. customization of how data is extracted from data sources, how the extracted data is formatted, and/or how the formatted data is displayed).

Within the first system instance 416, the update package creation component (1) 410 may be invoked to build an update package 412 with a Lab module (e.g., a module element within the data aggregation platform (1) used to manage lab data) and a Lab baseview (e.g., a user interface display element used to interact and manage lab data from the Lab module). The update package creation component (1) 410 may invoke a module provider to derive Lab module update data from the Lab module and concatenate the Lab module update data into a data structure. The update package creation component (1) 410 may invoke a baseview provider to derive Lab baseview update data from the Lab baseview and concatenate the Lab baseview update data into the data structure. The update package creation component (1) 410 may build the update package 412 from the data structure, wherein the update package 412 is configured such that target elements that are updated using the update package 412 may retain their original target element configuration. The update package 412 may comprise an update Lab module and an update Lab baseview.

Within the second system instance 418, the update package utilization component (2) 414 may be invoked to upgrade, overwrite, and/or create a new instance of elements within the update package 412. In one example, the update package 412 and a command comprising a new instance selection may be received, wherein a new instance of the update Lab module is to be created in a target destination within the data aggregation platform (2). A module provider may be invoked to create the new instance of the update Lab module within the target destination. In another example, a command comprising an upgrade selection may be received, wherein an existing Lab baseview within the data aggregation platform (2) is to be upgraded with the update Lab baseview. A baseview provider may be invoked to upgrade the existing Lab baseview with the update Lab baseview, wherein an original target element configuration of the Lab baseview is preserved. In yet another example, a command comprising an overwrite selection may be received, wherein an existing Lab baseview within the data aggregation platform (2) is to be overwritten with the update Lab baseview by a baseview provider.

Figure 5:
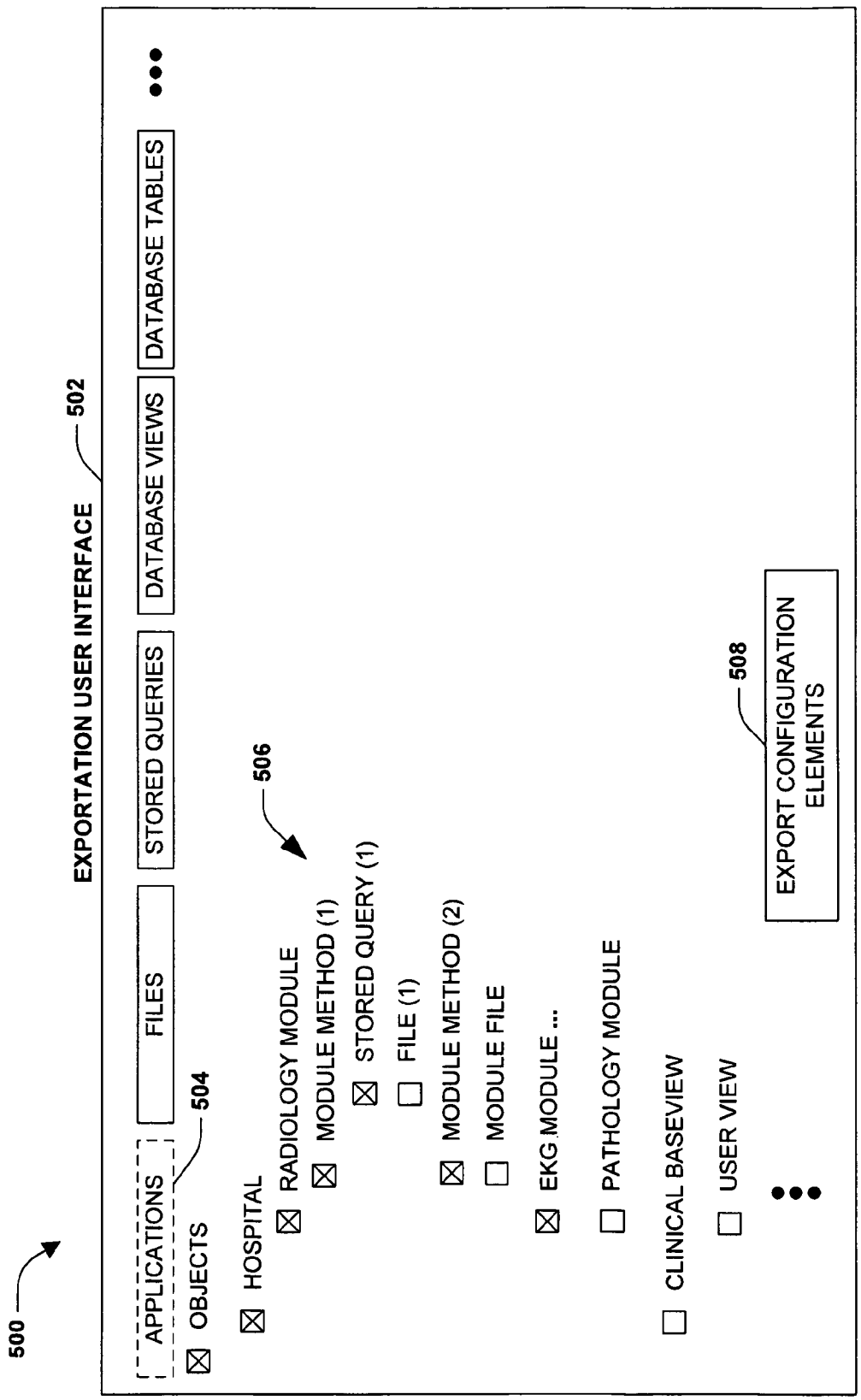
FIG. 5 is an illustration of an example of an exportation user interface.

This allows elements within the data aggregation platform to be upgraded without losing user customization. For example, a module and its stored queries may be upgraded from version 2.1 to version 2.2 without losing user customization (e.g., configuration data relating to where data is extracted, how the extracted data is formatted, how the formatted data is displayed, etc.) It also provides the flexibility in creating new instances of elements and/or overwriting existing elements. It may be appreciated that one or more similar elements (e.g., an instance of an existing element and an instance of the existing element after an upgrade selection is performed) may be executed side-by-side (e.g., concurrently in terms of processing/execution and/or display within one or more GUIs). This allows upgrades to be compared for correctness and provides a user the ability to perform an end-user acceptance. For example, a second element may be created based upon a first element. An upgrade selection may be performed upon the second element. The first element and the upgraded second element may be executed side-by-side FIG. 5 illustrates an example 500 of an exportation user interface 502 associated with a computer software platform. The exportation user interface 502 may comprise one or more configuration elements 506, which may be grouped by categories (e.g., an applications tab 504, a files tab, a stored queries tab, a database views tab, a database tables tab, etc.). In one example, the applications tab 504 may be selected, whereupon the one or more configuration elements 506 may be presented. Within the exportation user interface 502, the one or more configuration elements 506 may be selectable for exportation. For example, a Radiology module configuration (first configuration element) and an EKG module configuration (a second configuration element) within a hospital may be selected. It may be appreciated that configuration elements may be derivative of one another. For example, the radiology module configuration may comprise a Module file configuration, a Module method (2) configuration, and a Module method (1) configuration, wherein the module method (1) configuration may comprise a stored query (1) configuration and a file (1) configuration.

In one example, the Radiology module configuration, the Module method (1) configuration, the Stored query (1) configuration, and/or the Module method (2) configuration may be selected for exportation. The EKG module configuration may also be selected for exportation. An exportation configuration elements button 508 may be invoked to build a configuration package. For example, module provider may be invoked to derive exportation data from the Radiology module configuration and/or the EKG module configuration, in which the exportation data is concatenated into a data structure. A stored query provider may be invoked to derive exportation data from the Stored query (1) configuration, in which the exportation data is concatenated into the data structure. Finally, a module method provider may be invoked to derive exportation data from the Module method (1) configuration and the Module method (2) configuration, in which the exportation data is concatenated into the data structure. The configuration package may be built from the data structure.

Figure 6:
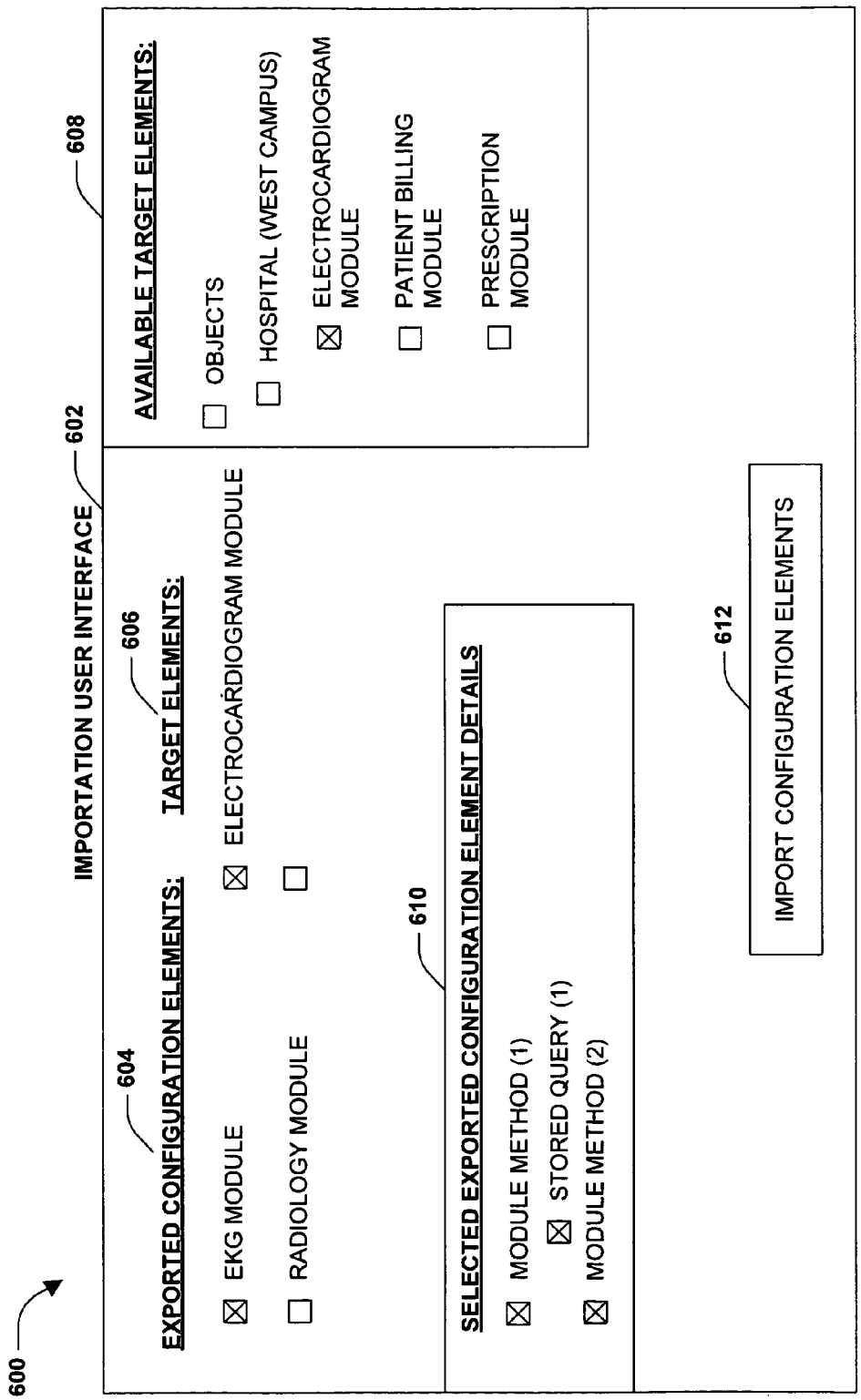
FIG. 6 is an illustration of an example of an importation user interface.

FIG. 6 illustrates an example 600 of an importation user interface 602 associated with a computer software platform. The importation user interface 602 may present one or more exported configuration elements 604 of a configuration package, wherein the one or more exported configuration elements 604 may be selected along with corresponding target elements 606 as an importation selection. Upon selection of an exported configuration element (e.g., an exported EKG module configuration), a selected exportation configuration element details 610 may be presented. For example, upon selection of the exported EKG module configuration, an exported Module method (1) configuration, an exported Stored query (1) configuration, and an exported Module method (2) configuration may be presented. This allows for further selection of exported configuration elements to importation.

Within the importation user interface 602, an available target elements 608 may be presented. The available target elements may provide a selectable list of target elements within which an exported configuration element may be imported (e.g., elements within a data aggregation platform within which the importation user interface 602 is associated). For example, the exported EKG module configuration may be selected. Within the available target elements, an electrocardiogram module may be selected as the target element that is to be configured with the exported EKG module configuration. Once the exported EKG module configuration and the electrocardiogram module target element are selected as an importation selection, the import configuration elements button 612 may be invoked to import the exported EKG module configuration into the electrocardiogram module target element using a module provider. It may be appreciated that the exported Module method (1) configuration, the exported Stored query (1) configuration, and the exported Module method (2) configuration may also be imported based upon user selection within the selected exported configuration element details 610.

Figure 7:
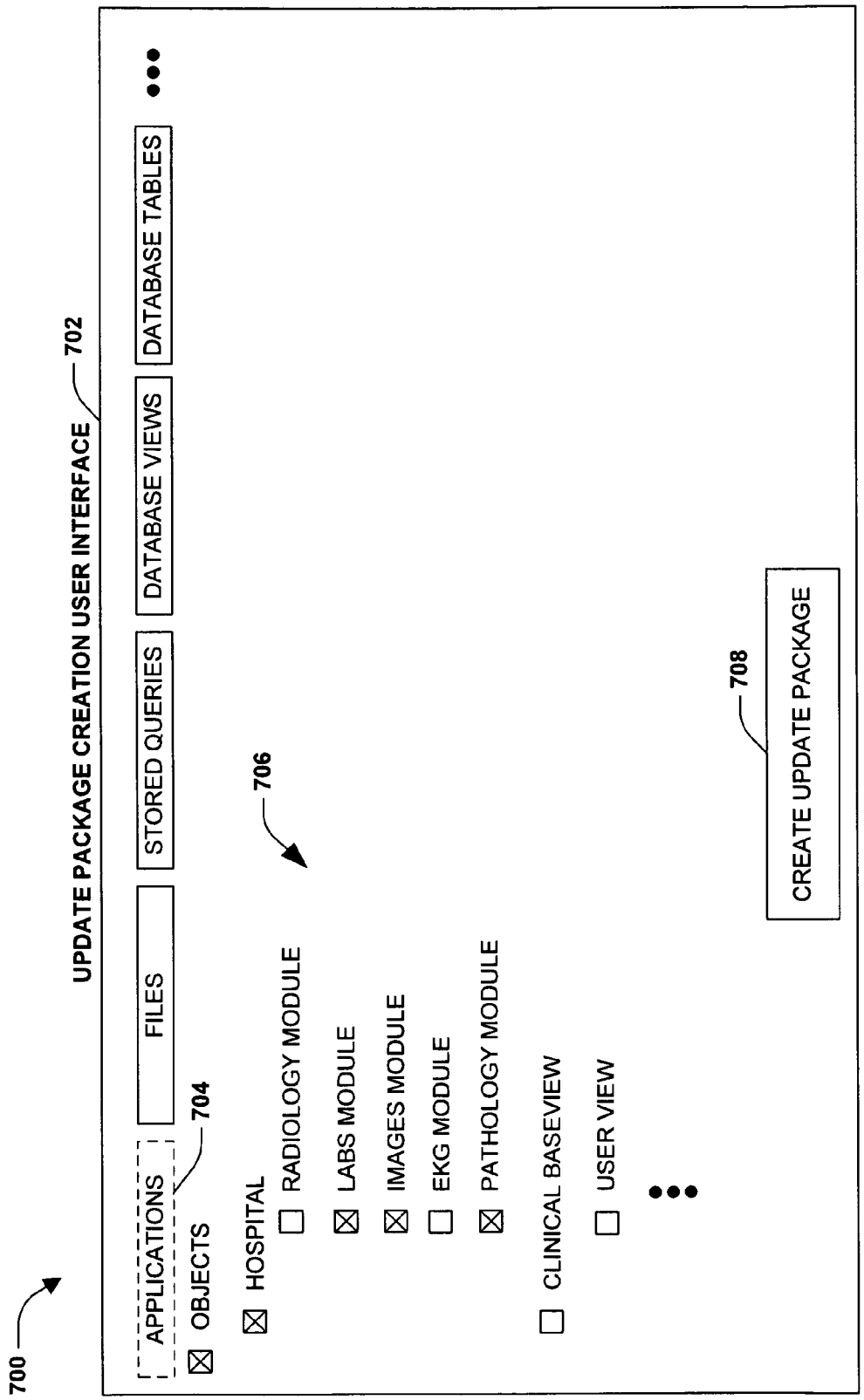
FIG. 7 is an illustration of an example of an update package creation user interface.

FIG. 7 illustrates an example 700 of an update package creation user interface 702 associated with a computer software platform. The update package creation user interface 702 may comprise one or more elements 706, which may be grouped by categories (e.g., an applications tab 704, a files tab, a stored queries tab, a database views tab, a database tables tab, etc.). In one example, the applications tab 704 may be selected, whereupon the one or more elements 706 may be presented within the update package creation user interface 702. The one or more elements 706 may be selectable for deriving an update package. For example, a Labs module, an Images module, and a Pathology module may be selected as a set of one or more selected elements.

A create update package button 708 may be invoked to build the update package. A module provider may derive update data from the Labs module, the Images module, and the Pathology module and concatenate the update data into a data structure. The update package may be built based upon the data structure. It may be appreciated that the update package may be configured such that target elements upgraded with the update Labs module, the update Images module, and/or the update Pathology module will retain their original target element configurations (e.g., user customizations may be retained).

Figure 8:
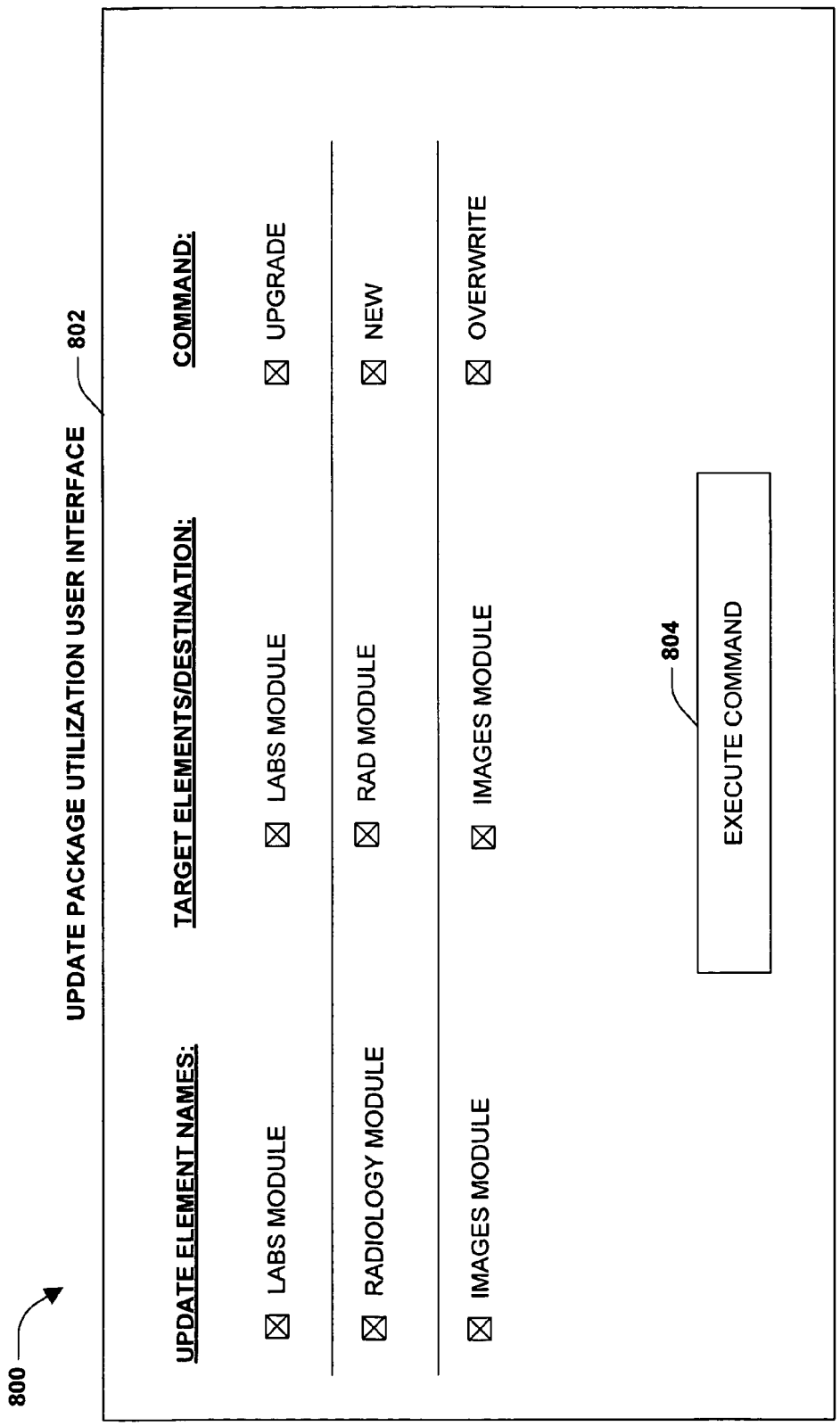
FIG. 8 is an illustration of an example of an update package utilization user interface.

FIG. 8 illustrates an example 800 of an update package utilization user interface 802 associated with a computer software platform. The update package utilization user interface 802 may present one or more update elements of an update package, wherein the one or more update elements may be selected for updating (e.g., upgrading, overwriting, creating a new instance, etc.) target elements and/or target destinations.

In one example, an update package may comprise an update Labs module, an update Radiology module, and an update Images module. The update Labs module may be selected as an upgrade selection (e.g., a command) to upgrade a Labs module (e.g., a target element). The update Radiology module may be selected as a new instance selection to create a new instance of the Radiology module. The update Images module may be selected as an overwrite selection of an existing Images module. An execute command button 804 may be invoked to perform the respective commands through a corresponding provider (e.g., a module provider) It may be appreciated that the Labs module target element may retain its original target element configuration after being upgraded with the update Labs module.

Figure 9:
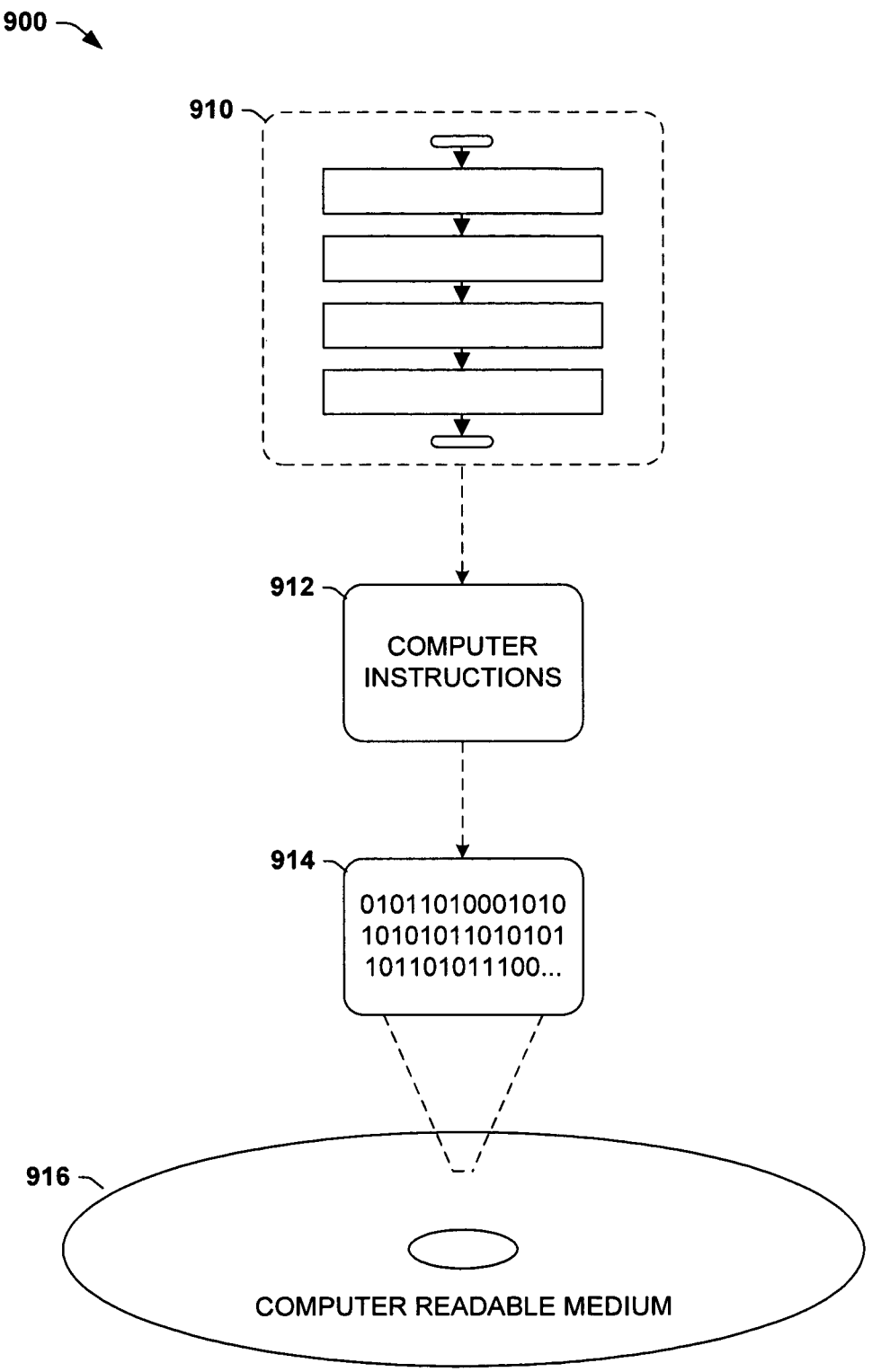
FIG. 9 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 9, wherein the implementation 900 comprises a computer-readable medium 916 (e.g., a CD-R, DVD-R, or a platter of a hard disk drive), on which is encoded computer-readable data 914. This computer-readable data 914 in turn comprises a set of computer instructions 912 configured to operate according to one or more of the principles set forth herein. In one such embodiment 900, the processor-executable instructions 912 may be configured to perform a method 910, such as the exemplary method 100 of FIG. 1 and/or the exemplary method 200 of FIG. 2, for example. In another such embodiment, the processor-executable instructions 912 may be configured to implement a system, such as the exemplary system 400 of FIG. 4, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 10:
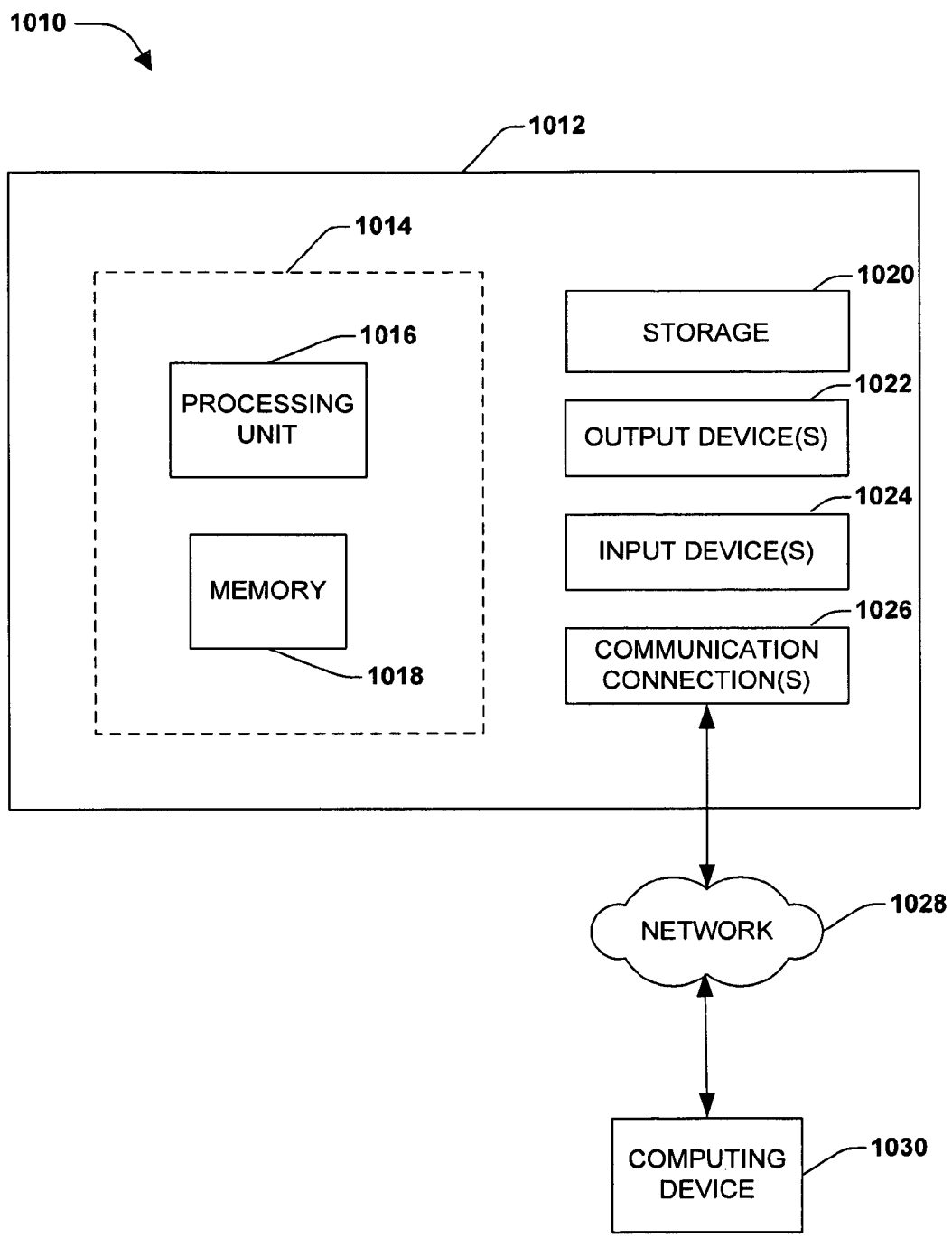
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like. It may be appreciated that the computing environment may be configured to execute enterprise software, service software, hosted model software, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1010 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof.

In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via a network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for updating an application utilizing an update package while retaining an original target element configuration, comprising:
   receiving an update package comprising first update data corresponding to a first element of an application and second update data corresponding to a second element of the application;
   receiving a descriptor file associated with the update package, the descriptor file indicating that a first provider is configured to import the first update data and a second provider, different than the first provider, is configured to import the second update data;
   invoking the first provider to import the first update data into the application before invoking the second provider to import the second update data based upon a derivative relationship between the first update data and the second update data to maintain element integrity, the invoking the first provider comprising updating an original instance of the first element while retaining an original target element configuration of the first element; and
   invoking the second provider to import the second update data into the application, the invoking the second provider comprising:
      creating a new instance of the second element while retaining an original instance of the second element; and
      executing the application to provide a side-by-side comparison of the original instance of the second element and the new instance of the second element.

2. The method of claim 1, the update package corresponding to a script file.

3. The method of claim 1, the application is related to a hospital.

4. The method of claim 2, comprising: providing the script file to a provider.

5. The method of claim 1, the executing the application comprising:
   responsive to receiving input indicating that the new instance of the second element is to be used, replacing the original instance of the second element with the new instance of the second element.

6. The method of claim 1, the first provider comprising functionality not comprised within the update package.

7. A computer memory which does not include signal or carrier wave, comprising instructions that when executed perform a method for updating an application utilizing an update package while retaining an original target element configuration, comprising:
   receiving an update package comprising first update data corresponding to a first element of an application and second update data corresponding to a second element of the application;
   receiving a descriptor file associated with the update package, the descriptor file indicating that a first provider is configured to import the first update data and a second provider, different than the first provider, is configured to import the second update data;
   invoking the first provider to import the first update data into the application before invoking the second provider to import the second update data based upon a derivative relationship between the first update data and the second update data to maintain element integrity, the invoking the first provider comprising updating an original instance of the first element while retaining an original target element configuration of the first element; and
   invoking the second provider to import the second update data into the application, the invoking the second provider comprising:
      creating a new instance of the second element while retaining an original instance of the second element; and
      executing the application to provide a side-by-side comparison of the original instance of the second element and the new instance of the second element.

8. The computer memory of claim 7, the application is related to a hospital.

9. The computer memory of claim 7, the executing the application comprising:
   responsive to receiving input indicating that the new instance of the second element is to be used, replacing the original instance of the second element with the new instance of the second element.

10. The computer memory of claim 9, the replacing comprising:
    retaining an original target element configuration of the second element.

11. The computer memory of claim 7, the update package corresponding to a script file.

12. The computer memory of claim 7, the first provider comprising functionality not comprised within the update package.

13. The computer memory of claim 7, the executing the application comprising:
    responsive to receiving a first input associated with the original instance of the second element, invoking first computational logic associated with the original instance of the second element; and
    responsive to receiving a second input associated with the new instance of the second element, invoking second computational logic associated with the new instance of the second element.

14. The computer memory of claim 7, the method comprising:
    retaining an original target element configuration of the second element.

15. The computer memory of claim 11, the method comprising providing the script file to a provider.

16. A system for updating an application utilizing an update package while retaining an original target element configuration, comprising:
    one or more processing units; and
    memory comprising instructions that when executed by at least some of the one or more processing units, provide for:
       an update package utilization component configured to:
          receive an update package comprising first update data corresponding to a first element of an application and second update data corresponding to a second element of the application;
          receive a descriptor file associated with the update package, the descriptor file indicating that a first provider is configured to import the first update data and a second provider, different than the first provider, is configured to import the second update data;

invoke the first provider to import the first update data into the application before invoking the second provider to import the second update data based upon a derivative relationship between the first update data and the second update data to maintain element integrity;

update an original instance of the first element while retaining an original target element configuration of the first element; and invoke the second provider to import the second update data into the application, the invoking the second provider comprising:

creating a new instance of the second element while retaining an original instance of the second element; and executing the application to provide a side-by-side comparison of the original instance of the second element and the new instance of the second element.

17. The system of claim 16, the update package utilization component configured to:

responsive to receiving input indicating that the new instance of the second element is to be used, replace the original instance of the second element with the new instance of the second element.

18. The system of claim 16, the application is related to a hospital.

19. The system of claim 16, the update package corresponding to a script file.

20. The system of claim 19, the update package utilization component configured to:

provide the script file to a provider.

* * * * *